United States Patent
Cho

(10) Patent No.: US 11,305,719 B2
(45) Date of Patent: Apr. 19, 2022

(54) CURTAIN AIRBAG DEVICE

(71) Applicant: HYUNDAI MOBIS CO., LTD., Seoul (KR)

(72) Inventor: Kwang Soo Cho, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/884,346

(22) Filed: May 27, 2020

(65) Prior Publication Data
US 2020/0384938 A1    Dec. 10, 2020

(30) Foreign Application Priority Data

Jun. 4, 2019    (KR) .................. 10-2019-0065892

(51) Int. Cl.
| | |
|---|---|
| *B60R 21/217* | (2011.01) |
| *B60R 21/264* | (2006.01) |
| *B60R 21/214* | (2011.01) |
| *B60R 21/231* | (2011.01) |
| *B60R 21/232* | (2011.01) |
| *B60R 21/00* | (2006.01) |

(52) U.S. Cl.
CPC .......... *B60R 21/217* (2013.01); *B60R 21/264* (2013.01); *B60R 21/214* (2013.01); *B60R 21/232* (2013.01); *B60R 21/23138* (2013.01); *B60R 2021/0006* (2013.01)

(58) Field of Classification Search
CPC .................................................. B60R 21/2171
See application file for complete search history.

(56) References Cited

U.S. PATENT DOCUMENTS

| | | | |
|---|---|---|---|
| 2011/0163521 A1* | 7/2011 | Gammill | ............... B60R 21/232 |
| | | | 280/728.2 |
| 2016/0144819 A1* | 5/2016 | Cho | ...................... B60R 21/213 |
| | | | 280/728.2 |
| 2017/0247009 A1* | 8/2017 | Konaka | ................. B60R 21/232 |

FOREIGN PATENT DOCUMENTS

| | | | | |
|---|---|---|---|---|
| DE | 202016107170 U1 * | 2/2017 | ........... | B60R 21/235 |
| JP | 5714746 B2 * | 5/2015 | | |
| JP | 5990156 B2 * | 9/2016 | | |
| JP | 6085584 B2 * | 2/2017 | | |
| JP | 6100126 B2 * | 3/2017 | | |
| JP | 2019104314 A * | 6/2019 | | |
| WO | WO-2015016324 A1 * | 2/2015 | ......... | B60R 21/2171 |
| WO | WO-2017105664 A1 * | 6/2017 | ........... | B60R 21/201 |

* cited by examiner

*Primary Examiner* — Nicole T Verley
(74) *Attorney, Agent, or Firm* — DLA Piper LLP (US)

(57) ABSTRACT

A curtain airbag device may include: an inflator configured to generate operating gas; a bracket part installed in a shape to abut on a side surface of the inflator, and having one side installed so as to be inclined in a direction away from the inflator; a cushion part inserted into a mounting space formed between the inflator and the bracket part, and inflated by the operating gas generated through the inflator; and a clamping part installed in a shape to surround outsides of the cushion part and the bracket part.

7 Claims, 4 Drawing Sheets

CURTAIN AIRBAG DEVICE

CROSS-REFERENCE TO RELATED APPLICATION

This application claims priority from and the benefit of Korean Patent Application No. 10-2019-0065892, filed on Jun. 4, 2019, which is hereby incorporated by reference for all purposes as if set forth herein.

BACKGROUND

Field

Exemplary embodiments of the present disclosure relate to a curtain airbag device, and more particularly, to a curtain airbag device which includes a cushion part assembled between an inflator and a bracket part and thus can simplify an installation structure without a reduction in internal pressure.

Discussion of the Background

In general, a vehicle includes various airbags to protect a passenger from a collision. Among such airbags, a curtain airbag which protects a passenger from a side collision of a vehicle is installed in a front-to-rear direction along a side surface of a roof panel. The curtain airbag serves to not only absorb an impact transferred to a passenger, but also hold the passenger such that the passenger is not thrown out of the vehicle, when a collision of the vehicle occurs.

The curtain airbag has a cushion which is mounted on a roof rail of a vehicle body, and deployed by high-temperature and high-pressure gas in case of a side collision. In the curtain airbag, an inflator and the cushion are mainly assembled through two kinds of methods.

In a first curtain airbag assembly structure, the inflator is inserted into the cushion, and a clamping part is applied and fixed to the outer circumferential part of the cushion. In such a curtain airbag, however, a bracket and the inflator need to be fixed at two or more locations when the bracket for mounting the vehicle body is assembled with the inflator. Therefore, the number of assembling processes is increased to raise a manufacturing cost.

In a second curtain airbag assembly structure, a cushion is installed on the outside of an assembly module composed of an inflator and a bracket, and fixed by a clamp which covers the outside of the cushion. In such a curtain airbag, however, the bracket is inserted into the cushion and then fixed by the clamp. Thus, gas leakage is highly likely to occur around the bracket. Therefore, there is a need for a structure capable of solving the problem.

SUMMARY

Various embodiments are directed to a curtain airbag device which includes a cushion part assembled between an inflator and a bracket part and thus can simplify an installation structure without a reduction in internal pressure.

In an embodiment, a curtain airbag device may include: an inflator configured to generate operating gas; a bracket part installed in a shape to abut on a side surface of the inflator, and having one side installed so as to be inclined in a direction away from the inflator; a cushion part inserted into a mounting space formed between the inflator and the bracket part, and inflated by the operating gas generated through the inflator; and a clamping part installed in a shape to surround outsides of the cushion part and the bracket part.

The bracket part may include: a straight body extended in a straight direction while abutting on the side surface of the inflator; and an inclined body inclined and extended from the straight body in the direction away from the inflator.

The inclined body may be pressurized by the clamping part, and constrains the movement of the cushion part located an outside of the inflator.

The curtain airbag device may further include a fixing member configured to surround outsides of the straight body and the inflator, and fix the straight body to the inflator.

The clamping part may be installed while surrounding an outside of the inclined body, facing the cushion part, in a circumferential direction.

The inflator may have a circular rod shape, and the bracket part may be a curved plate abutting on an outside of the inflator.

The cushion part may be located between the inflator and the bracket part while covering a gas outlet of the inflator.

In accordance with the embodiment of the present disclosure, the cushion part may be inserted between the inflator and the bracket part bent at the preset angle, and fixed by the clamping part. Therefore, leakage of the operating gas can be prevented to block a reduction in internal pressure, and the installation structure can be simplified more than in the related art and thus improve the productivity.

DETAILED DESCRIPTION OF THE ILLUSTRATED EMBODIMENTS

Hereinafter, a curtain airbag device will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
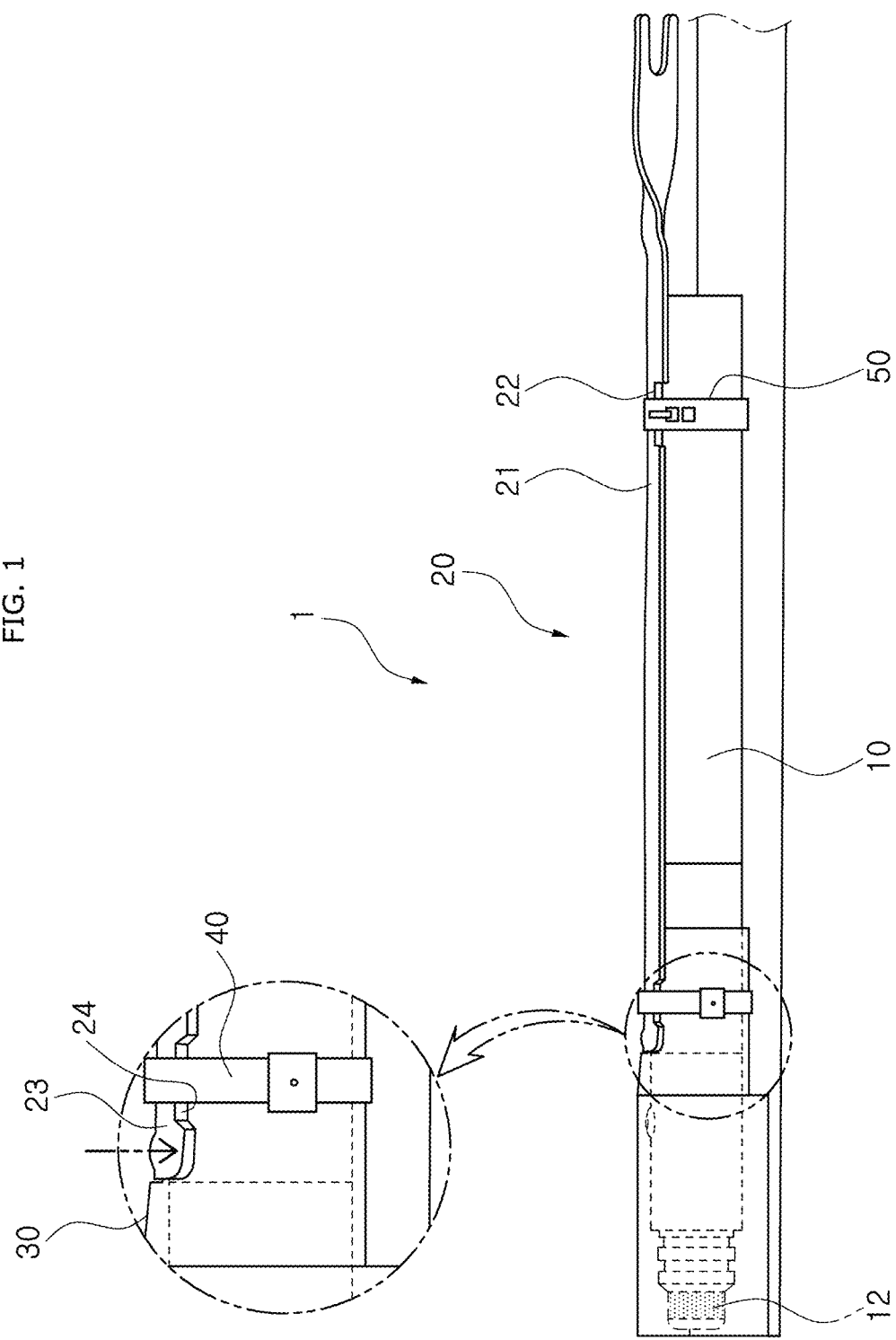
FIG. 1 is a front view schematically illustrating a curtain airbag device in accordance with an embodiment of the present disclosure.
Figure 2:
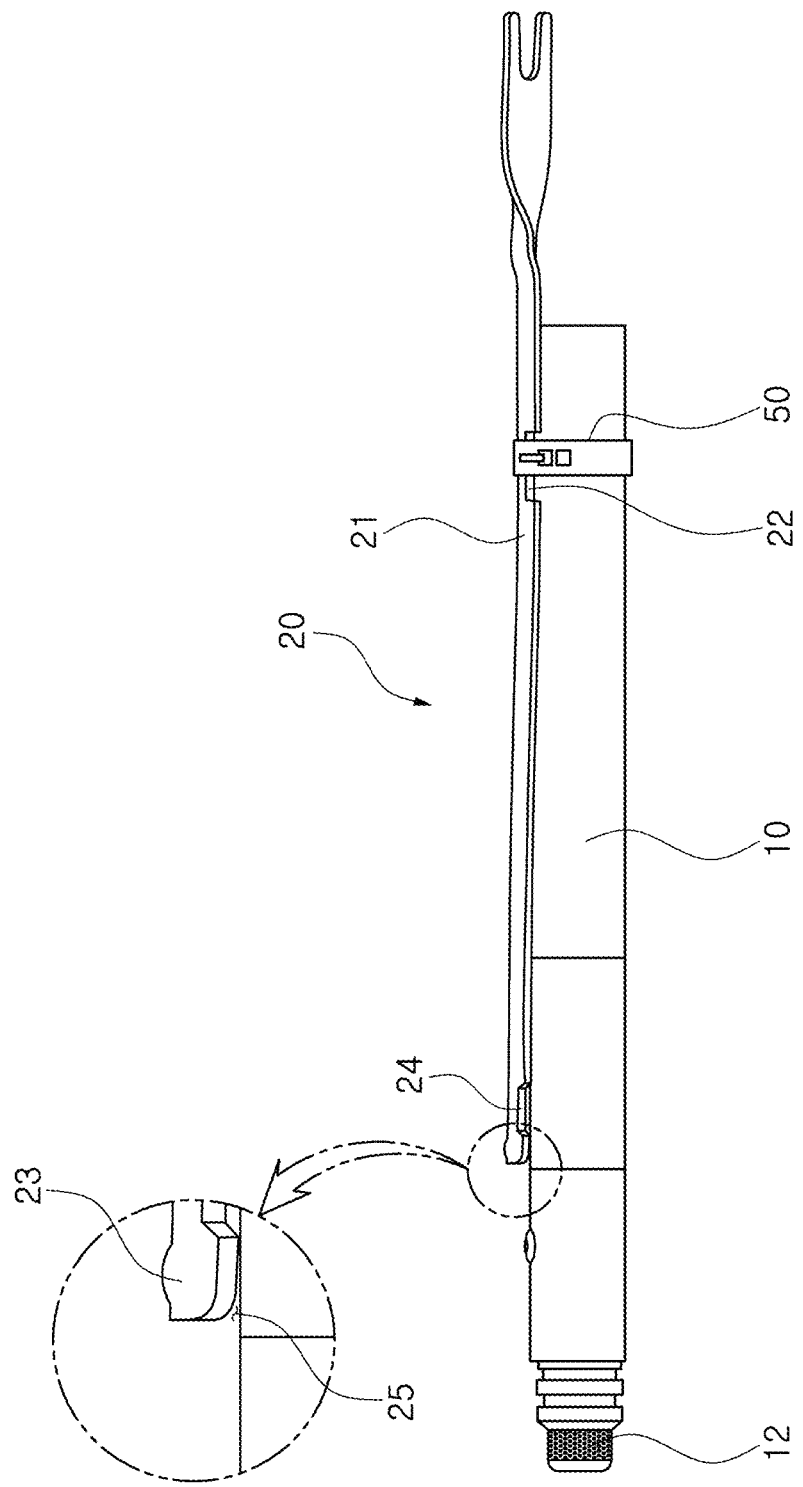
FIG. 2 is a front view illustrating that a bracket part is installed outside an inflator in accordance with the embodiment of the present disclosure.
Figure 3:
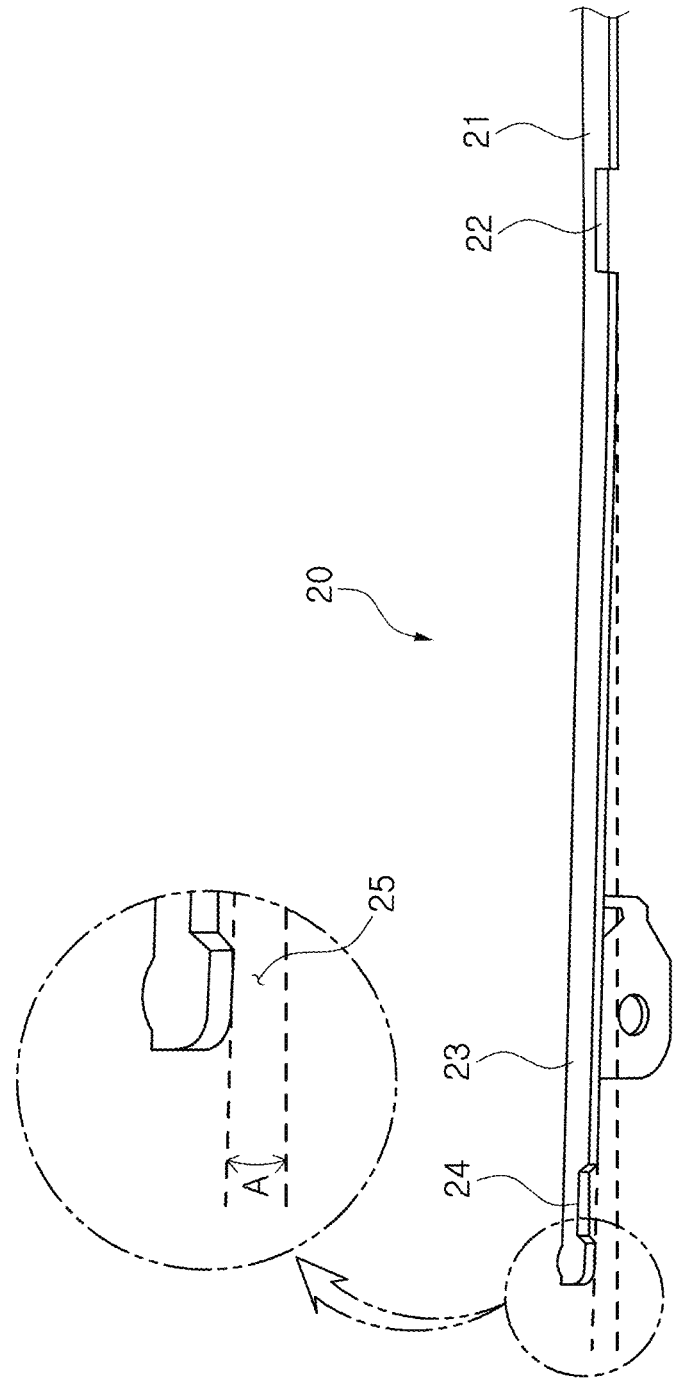
FIG. 3 is a front view illustrating the bracket part in accordance with the embodiment of the present disclosure.
Figure 4:
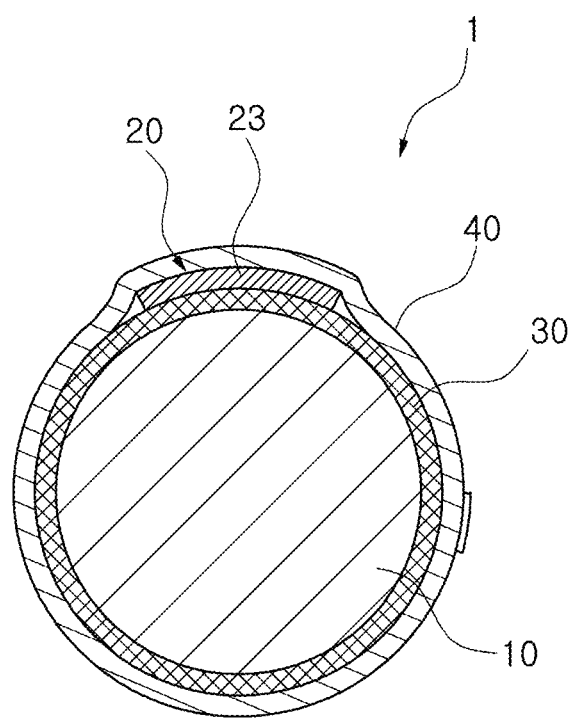
FIG. 4 is a cross-sectional view of the curtain airbag device in accordance with the embodiment of the present disclosure.

FIG. 1 is a front view schematically illustrating a curtain airbag device in accordance with an embodiment of the present disclosure, FIG. 2 is a front view illustrating that a bracket part is installed outside an inflator in accordance with the embodiment of the present disclosure, FIG. 3 is a front view illustrating the bracket part in accordance with the embodiment of the present disclosure, and FIG. 4 is a cross-sectional view of the curtain airbag device in accordance with the embodiment of the present disclosure.

As illustrated in FIGS. 1 to 4, the curtain airbag device 1 in accordance with the embodiment of the present disclosure includes an inflator 10, a bracket part 20, a cushion part 30 and a clamping part 40. The inflator 10 generates operating gas. The bracket part 20 is installed in a shape to abut on a side surface of the inflator 10, and has one side that is installed so as to be inclined in a direction away from the inflator 10. The cushion part 30 is inserted into a mounting space 25 formed between the inflator 10 and the bracket part 20, and inflated by the operating gas generated by the inflator 10. The clamping part 40 is installed in a shape to surround the outsides of the cushion part 30 and the bracket part 20.

The inflator 10 is operated to generate operating gas in case of a collision accident of a vehicle, thereby inflating the cushion part 30. The inflator 10 in accordance with the embodiment of the present disclosure is formed in a circular rod shape, and the bracket part 20 is installed outside the inflator 10.

The bracket part 20 is installed in a shape to abut on the side surface of the inflator 10, and the one side (left side in FIG. 2) of the bracket part 20 can be modified in various shapes as long as the one side is installed so as to be inclined in the direction away from the inflator 10 (top side in FIG. 2). The bracket part 20 in accordance with the embodiment of the present disclosure includes a straight body 21, a first side groove 22, an inclined body 23 and a second side groove 24.

The straight body 21 is extended in a straight direction while abutting on the side surface of the inflator 10. The straight body 21 placed close to the outside of the inflator 10 is extended in a horizontal direction (based on FIG. 2) along the inflator 10.

The inclined body 23 is bent at a preset angle A and extended from the straight body 21, and separated from the inflator 10 so as to form the mounting space 25 for installing the cushion part 30. Furthermore, the inclined body 23 is inclined and extended from the straight body 21 in the direction away from the inflator 10. The inclined body 23 is pressurized by the clamping part 40, and pressurizes the cushion part 30, located outside the inflator 10, toward the inflator 10.

The inflator 10 in accordance with the embodiment of the present disclosure has a circular rod shape, and the bracket part 20 is a curved plate abutting on the outside of the inflator 10. Since the straight body 21 is brought into surface contact with the outside of the inflator 10, the bracket part 20 may be stably fixed to the outside of the inflator 10.

The inclined body 23 may be installed so as to be bent at the preset angle A about an end of the straight body 21, and extended in parallel to the inflator 10 while forming a step based on the straight body 21, thereby forming the mounting space 25. That is, the inclined body 23 may be modified in various manners.

The straight body 21 has the first side groove 22 formed on either side thereof in a widthwise direction, the first side groove 22 having a concave shape. Thus, since a belt-shaped fixing member 50 is inserted and installed in the first side groove 22, the first side groove 22 constrains the fixing member 50 from moving in a longitudinal direction along the inflator 10.

The inclined body 23 has the second side groove 24 formed on either side thereof to constrain the clamping part 40 from moving in the longitudinal direction of the bracket part 20 after the clamping part 40 is installed. The second side groove 24 is concavely formed on either side of the inclined body 23 in the widthwise direction. Therefore, since the clamping part 40 is inserted and installed in the second side groove 24, the second side groove 24 constrains the clamping part 40 from moving in the longitudinal direction along the inflator 10.

The cushion part 30 is inserted into the mounting space 25 formed between the inflator 10 and the bracket part 20, and inflated by the operating gas generated by the inflator 10. The cushion part 30 in accordance with the embodiment of the present disclosure is located between the inflator 10 and the bracket part 20 while covering a gas outlet 12 of the inflator 10.

That is, the cushion part 30 is installed in a shape to cover one end of the inflator 10, and located between the inflator 10 and the bracket part 20. The cushion part 30 is fixed between the bracket part 20 and the inflator 10 by the clamping part 40 which is fixed while covering the outside of the inclined body 23.

The clamping part 40 is installed while surrounding the outside of the inclined body 23, facing the cushion part 30, in a circumferential direction. The clamping part 40 is a belt-shaped coupling member which is installed in a shape to surround the outsides of the cushion part 30 and the bracket part 20.

The fixing member 50 is a belt-shaped coupling member which surrounds the outsides of the straight body 21 and the inflator 10, and fixes the straight body 21 to the inflator 10. The fixing member 50 may be fixed to the vehicle body and constrain the movement of the inflator 10.

Hereafter, the assembly structure of the curtain airbag device 1 in accordance with the embodiment of the present disclosure will be described in detail with reference to the accompanying drawings.

The inclined body 23 of the bracket part 20 is bent at the preset angle A before being assembled to the inflator 10, and the fixing member 50 is installed in the first side groove 22 of the bracket part 20, such that the straight body 21 and the inflator 10 are primarily fixed to each other.

The mounting space 25 is formed between the inclined body 23 and the inflator 10, and the cushion part 30 covering the gas outlet 12 of the inflator 10 is inserted into the mounting space 25 and located between the inclined body 23 and the inflator 10.

The clamping part 40 installed in the second side groove 24 of the inclined body 23 pressurizes the inclined body 23 toward the inflator 10, and constrains the movement of the cushion part 30. Therefore, with the cushion part 30 located between the bracket part 20 and the inflator 10, the movement of the cushion part 30 is constrained by the fixation of the clamping part 40.

When the inflator 10 is operated in case of a vehicle accident, the cushion part 30 is inflated by operating gas coming out through the gas outlet 12 of the inflator 10, and thus reduces a passenger's injury.

In accordance with the embodiment of the present disclosure, the cushion part 30 may be inserted between the inflator 10 and the bracket part 20 bent at the preset angle A, and fixed by the clamping part 40. Therefore, leakage of the operating gas can be prevented to block a reduction in internal pressure, and the installation structure can be simplified more than in the related art and thus improve the productivity.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A curtain airbag device comprising:
an inflator configured to generate operating gas;
a bracket part installed in a shape to abut on a side surface of the inflator, and having an inclined body installed so as to be inclined in a direction away from the inflator, the inclined body extending to an end of the bracket part in a direction toward a gas outlet;
a cushion part inserted into a mounting space formed between the inflator and the bracket part, and inflated by the operating gas generated through the inflator; and
a clamping part installed in a shape to surround outsides of the cushion part and the bracket part.

2. The curtain airbag device of claim 1, wherein the bracket part comprises:
a straight body extended in a straight direction while abutting on the side surface of the inflator; and
the inclined body inclined and extended from the straight body in the direction away from the inflator.

3. The curtain airbag device of claim 2, wherein the inclined body is pressurized by the clamping part, and constrains the movement of the cushion part located an outside of the inflator.

4. The curtain airbag device of claim 2, further comprising a fixing member configured to surround outsides of the straight body and the inflator, and fix the straight body to the inflator.

5. The curtain airbag device of claim 4, wherein the clamping part is installed while surrounding an outside of the inclined body, facing the cushion part, in a circumferential direction.

6. The curtain airbag device of claim 1, wherein the inflator has a circular rod shape, and the bracket part is a curved plate abutting on an outside of the inflator.

7. The curtain airbag device of claim 1, wherein the cushion part is located between the inflator and the bracket part while covering the gas outlet of the inflator.

* * * * *